US012627025B2

(12) United States Patent
Kolokotronis

(10) Patent No.: US 12,627,025 B2
(45) Date of Patent: May 12, 2026

(54) ANTENNA SUPPORT SYSTEM

(71) Applicant: Dimitris Kolokotronis, Athens (GR)

(72) Inventor: Dimitris Kolokotronis, Athens (GR)

( * ) Notice: Subject to any disclaimer, the term of this patent is extended or adjusted under 35 U.S.C. 154(b) by 62 days.

(21) Appl. No.: 18/568,793

(22) PCT Filed: Jun. 8, 2022

(86) PCT No.: PCT/EP2022/065589
§ 371 (c)(1),
(2) Date: Dec. 8, 2023

(87) PCT Pub. No.: WO2022/258708
PCT Pub. Date: Dec. 15, 2022

(65) Prior Publication Data

US 2024/0266712 A1 Aug. 8, 2024

(30) Foreign Application Priority Data

Jun. 8, 2021 (GB) ...................................... 2108171

(51) Int. Cl.
*H01Q 1/12* (2006.01)
*H01Q 1/24* (2006.01)

(52) U.S. Cl.
CPC ......... *H01Q 1/1242* (2013.01); *H01Q 1/1228* (2013.01); *H01Q 1/125* (2013.01); *H01Q 1/246* (2013.01)

(58) Field of Classification Search
CPC .... H01Q 1/005; H01Q 1/1228; H01Q 1/1242; H01Q 1/1264; H01Q 1/125; H01Q 1/246; H01Q 3/02–08
See application file for complete search history.

(56) References Cited

U.S. PATENT DOCUMENTS 4,745,412 A 5/1988 Creaser, Jr.

FOREIGN PATENT DOCUMENTS

EP 1744397 A1 * 1/2007
JP H053407 A 1/1993
WO 2021074335 A1 4/2021

OTHER PUBLICATIONS

UK Intellectual Property Office, Search Report under Section 17(5), GB Application No. PGB2108171.6, dated Mar. 7, 2022, GB.
International Searching Authority, International Search Report, International Application No. PCT/EP2022/065589, dated Sep. 2, 2022, NL.
International Searching Authority, Written Opinion of the International Searching Authority, International Application No. PCT/EP2022/065589, dated Sep. 2, 2022, NL.

* cited by examiner

*Primary Examiner* — Robert Karacsony
(74) *Attorney, Agent, or Firm* — Reichel Stohry Dean LLP; Natalie J. Dean

(57) ABSTRACT

An antenna support system has a mast (10) comprising a first structural mast member (102), the first structural mast member (102) having a structural portion (120) for bearing at least part of the mast load in use a mounting portion (122) for attachment of an antenna. The structural portion and the mounting portion are formed as part of a first structural mast member cross-section. A first and second steering unit (142) is provided for mounting an antenna (116) for rotational movement relative to the mast in use.

19 Claims, 7 Drawing Sheets

ANTENNA SUPPORT SYSTEM

PRIORITY

The present application is related to, and claims the priority benefit of, and is a 35 U.S.C. 371 national stage application of, International Patent Application No. PCT/EP2022/065589, filed Jun. 8, 2022, which is related to, and claims the priority benefit of Great Britian Patent Application No. 2108171.6, filed Jun. 8, 2021. The contents of the aforementioned applications are hereby incorporated by reference in their entireties into this disclosure.

TECHNICAL FIELD

The present invention relates to an antenna support system. More specifically, the present invention relates to an antenna support system comprising a structural mast member having mounting formation(s) for the attachment of one or more modern, steerable cellular antennas.

BACKGROUND ART

By ‘modern’ cellular antennas we mean 5G technology and beyond, MIMO and massive-MIMO, multi-band, multi-beam, multi-directional, active or passive antennas.

Since the early days of mobile communication technology back in the 1990’s, directional cellular antennas on towers and masts have been installed using the same principle. The antennas have to be placed high up, away from the ground, in order to reduce the RF path-loss effects (or RF signal attenuation). The antennas also need to point in specific directions in the horizontal plane (i.e., at an azimuth angle about a vertical axis-alignment of the antenna directionality with respect to North) and in the vertical plane (i.e., tilt angle about an horizontal axis-alignment of the antenna directionality with respect to the earth’s centre of gravity) in order to satisfy certain RF planning criteria for optimum coverage, capacity and quality of wireless communications.

To install antennas at a specified height from the ground, mobile communication networks worldwide adopted the engineering and design of very well-known tower and mast types such as lattice and pole systems. The terms “mast” and “tower” are often used interchangeably, and it is to be understood that the term “mast” is used in this application to cover both masts and towers. However, it will be noted that in structural engineering terms, a tower is a self-supporting or cantilevered structure, while a mast is held up by stays or guys.

The self-supported lattice is the most widespread form of construction. It provides high strength, low weight and low wind resistance, and is economic in its use of materials. Lattices of triangular cross-section are most common, and square lattices are also widely used. Guyed lattice masts are also often used; the supporting guy lines carry lateral forces such as wind loads, allowing the mast to be very narrow and of modular construction. The entire structure is constructed by creating a series of horizontal ladders, or internal triangular structures, that secure the tower’s three, or four base legs. Guyed masts are also constructed out of steel tubes.

Last but not least monopole rooftop masts (which may be covered with camouflage and/or a radome) have been installed on top of many buildings. With the advent of urban mobile communications, developers wanted a more efficient way to construct and operate low-height elevation systems for aesthetic reasons. They conceived the idea of the monopole rooftop configuration, a lattice mast with a pole on top used for antenna mounting. These configurations became more fashionable once alternative construction materials began to exhibit greater strength and flexibility without failing. Today these free-standing masts are fabricated from various materials.

In order to install the antennas on towers and masts at specified directions with respect to North (azimuth alignment) and the earth’s centre of gravity (tilt alignment), the industry adopted the engineering and design of antenna azimuth and tilt mounting brackets.

The legacy antenna tilt bracket is a standard antenna accessory, delivered with the specific antenna purchased, and as such we will not further describe the various types of tilt bracket here. The most common type of antenna azimuth bracket in the field comprises a set of collars that are mounted on one side at the antenna tilt bracket and on the other side are fixed on a pole. Azimuth alignment is performed by loosening the collars, aligning the antenna and tightening the collars on the pole.

More sophisticated antenna azimuth brackets are described in detail in the applicant’s co-pending applications published as WO2019/110697 and WO2021/074335 (incorporated by reference where permissible).

Radio coverage of each antenna needs to be decided according to radio planning criteria. On a typical 3-sector site, each directional antenna needs to be capable of 120 degrees azimuth and 20 degrees tilt range (10 degrees up-tilt and 10 degrees down-tilt). Even fully equipped with both azimuth and tilt brackets, an antenna cannot be directly installed on the mast structure and still be capable of full movement in both azimuth and tilt directions. The main reason for that is the fact that modern cellular antenna geometry (panel type) are bulky, long (may reach up to 3 meters length), wide (may be more than half a meter wide) and heavy (may weight more than 50 kgs); not to mention that over a dozen coaxial cables are mounted on the bottom of the antenna that should not be over-bended, especially when the antenna is to be down-tilted.

Using the well-known set of collars for performing azimuth steering and alignment, the antenna always needs to be mounted on a mast’s structural member that is of circular cross-section, is capable of supporting the excessive weight and wind-load and of course has the required clearance from other antennas and the structure itself for azimuth alignment according to radio planning instructions (i.e. at least the first Fresnel zone should be always kept free of obstacles). This should be the case for pole masts, as poles are of circular shape and their main structural member is the pole itself, however, taking into account that usually 3 antennas (for a 3-sector site), half a meter wide and with azimuth range freedom of 120 degrees each are to be installed on the pole’s top, the pole should have more than 1 meter diameter in order to perform. Using such poles for the purpose, is not only expensive but also impractical (most of the times impossible) to implement. The situation is complicated further when the pole is to be supported by wires.

For the lattice mast types (guyed or self-supported), the same or more problems are to be tackled.

Lattices of either triangular or rectangular cross-section may have 3 or 4 vertical upright structural members respectively. These structural members are formed from various shapes such as equal angle sections, hollow square sections and the like that are mounted together with multiple horizontal and diagonal cross-members, spaced apart in sets (the number of which determines the mast height), so as forming the desired lattice mast configuration. In the context of the present application, the term “structural member” is used to denote a member that forms part of a lattice mast, and thus is typically one of a plurality of parallel, upright mast members which are linked together by cross-members.

Considering the known requirements for antenna mounting:

a) The antenna needs to be tightly secured, collinearly on a vertical structural member, otherwise the antenna reflector/backplane will twist. Geometric deformation of the antenna's reflector impacts its radiation performance, which is undesirable.
b) The antenna needs to be tightly secured with a baseline orientation perpendicular to the ground, otherwise both tilt and roll antenna dimensions will be offset from the global reference plane, which is the earth's centre of gravity.
c) The mast vertical structural members have limited available surface area for antenna mounting because the horizontal and diagonal cross-members are fixed to them in close patterns, and cannot be removed. The situation is further complicated when the lattice mast is to be supported by wires.
d) The antenna's vertical spacing of its top and bottom mounting points are fixed in position, which makes it very likely to coincide with the horizontal and diagonal cross-member mounting points on the mast vertical structural members. The situation is further complicated when the lattice mast is to be supported by wires.
e) The vertical members the antennas are attached to always need to have circular shape when using the well-known set of collars for performing antenna azimuth steering and alignment. This is not the case for the majority of lattice mast configurations.
f) An antenna of around three metres length and half a metre width needs to be placed spaced apart from the mast section on the horizontal plane in order to achieve azimuth steering of 120° range and tilt inclination of 20° range (up-tilt or down-tilt) without clashing on the mast structural members or other tower-top equipment installed.
g) After installation completion, it should be ensured that the antenna's first Fresnel zone is free of obstacles. Fresnel zone clearance is used to analyze interference by obstacles near the path of the antenna's main radiation beam. In establishing Fresnel zones, one needs to first determine the RF Line of Sight (RF LoS), which in simple terms is a straight line between the transmitting and receiving antennas. The zone surrounding the RF LOS is the Fresnel zone.
h) Having all these requirements in mind, the industry adopted the engineering and design of a universal antenna "support system" that could be installed without implementation problems on both pole and lattice masts while being capable for antenna azimuth and tilt alignment in order to satisfy both the structural engineering requirements and the radio planning instructions.

Applicant's published PCT application WO 2021/074335 discloses a new type of antenna mounting system in which a universal clamping system is adopted in order to attach the antenna directly to the tower members. The tower structural member is clamped at two spaced apart positions, and aligned azimuth steering units are secured to each of the spaced-apart clamps to which an antenna can be attached. The use of a mast clamp and steering unit of WO'335 is less bulky and heavy than the prior art pole spacing support and pole arrangement. The provision of a universal mast clamp in combination with an azimuth steering unit allows the reduction of the antenna system effective projected area and wind loading moment. The invention facilitates movement of the antenna closer to the mast, which is beneficial in mitigating among others the static, dynamic as well as tower capacity problems with the prior art.

It is an aim of the present invention to provide a further improved solution for the mounting of antennas to masts.

SUMMARY OF INVENTION

According to a first aspect of the present invention there is provided an antenna support system comprising:

- a mast comprising a first mast member, the first mast member having:
  - a structural portion for bearing at least part of the mast load in use; and,
  - a mounting portion for attachment of an antenna;
  - wherein the structural portion and the mounting portion are formed as part of a first structural mast member cross-section;
- a first steering unit;
- a first antenna;
- wherein the first steering unit is mounted to the mounting portion of the first structural mast member, and wherein the first antenna is mounted to the first a steering unit for rotational movement relative to the mast in use.

Advantageously integrating the structural element of the mast member and a mounting formation (such as a flange) eliminates the need to provide a separate mounting bracket as seen in the prior art. This means that the present invention can be used to provide antenna masts with lower cost (both CAPEX and labour). Further, the antennas can be mounted closer to the mast structure than the prior art, which reduces both static and dynamic loading in use.

Preferably the mast defines a primary axis, and the system comprises:

- a second steering unit;
- wherein the second steering unit is mounted to the mounting portion of the first mast member, and wherein the first antenna is mounted to the first steering unit and the second steering unit for rotational movement relative to the mast in use.

Preferably the first structural mast member is extruded.

Preferably the structural portion is a hollow section.

Preferably the hollow section is circular.

Preferably wherein the mounting portion extends radially from the hollow section.

Preferably the mounting portion comprises first and second spaced-apart, parallel arms and a mounting flange connection to the arms, distal to the hollow section.

Preferably the mounting flange extends outwardly of the arms to form a "T" shape in cross section.

Preferably the hollow section is polygonal.

Preferably the mounting portion comprises first and second parallel flanges extending from either side of a side of the polygonal cross section.

Preferably the structural portion is an angle section.

Preferably the mounting portion comprises first and second spaced-apart, parallel arms and a mounting flange connection to the arms, distal to the angle section.

Preferably the angle section comprises a first leg and a second leg, and wherein the first structural mast member comprises a first mounting portion extending from the first leg and a second mounting portion extending from the second leg.

Preferably the mounting portion comprises a plurality of through-bore for the attachment of the first steering unit and second steering unit.

Preferably the mounting portion forms a first flat plate having the plurality of through-bores formed therethrough. Preferably the plate extends to either side of the structural portion. Preferably there is provided a further mounting portion unitary with the structural portion to the mounting portion, the further mounting portion forming a further flat plate having a further plurality of through bores formed therethrough. Preferably the first and second flat plates are parallel and on opposite sides of the structural portion.

Preferably there is provided:

a further steering unit;

a further antenna;

wherein the further steering unit is mounted to the further mounting portion, and wherein the further antenna is mounted to the further steering unit for rotational movement relative to the mast in use.

Preferably a plurality of mounting portions is provided, each of which are unitary with the structural portion. Preferably the mounting portions are equally spaced around a primary axis of the structural portion.

Preferably there is provided:

a second steering unit;

wherein the second steering unit is mounted to the mounting portion such that its steering axis is aligned with the first steering unit, and wherein the second steering unit is mounted to the first antenna at a positioned spaced-apart from the first steering unit for rotational movement relative to the mast in use.

Preferably the cross-section of the mast member including the structural portion and mounting portion is constant along its length at, and between, the first and second steering units.

Preferably the mast member has:

a structural portion for bearing at least part of the mast load in use; and, a mounting portion for attachment of an antenna;

wherein the structural portion and the mounting portion are formed as part of a structural mast member cross-section; and, wherein the structural mast member is formed by extrusion.

According to a second aspect there is provided a method of manufacturing a structural mast member for a cellular antenna mast comprising the steps of:

providing an extrusion die defining an aperture having:

a structural portion for bearing at least part of the mast load in use; and, a mounting portion for attachment of an antenna;

extruding a structural mast member using the die.

Preferably the method comprises the step of:

forming openings in the mounting portion.

Preferably the method comprises the step of:

providing a first antenna steering unit;

attaching the first antenna steering unit to the mounting portion.

Preferably the method comprises the step of:

providing an antenna;

mounting the antenna to the steering unit for rotation relative to the structural mast member.

Preferably the method comprises the steps of:

providing a plurality of structural mast members;

assembling the plurality of structural mast members to form a lattice structure.

BRIEF DESCRIPTION OF DRAWINGS

An embodiment of the present invention will now be described with reference to the following figures in which.

DESCRIPTION OF THE FIRST EMBODIMENT

Figure 1A:
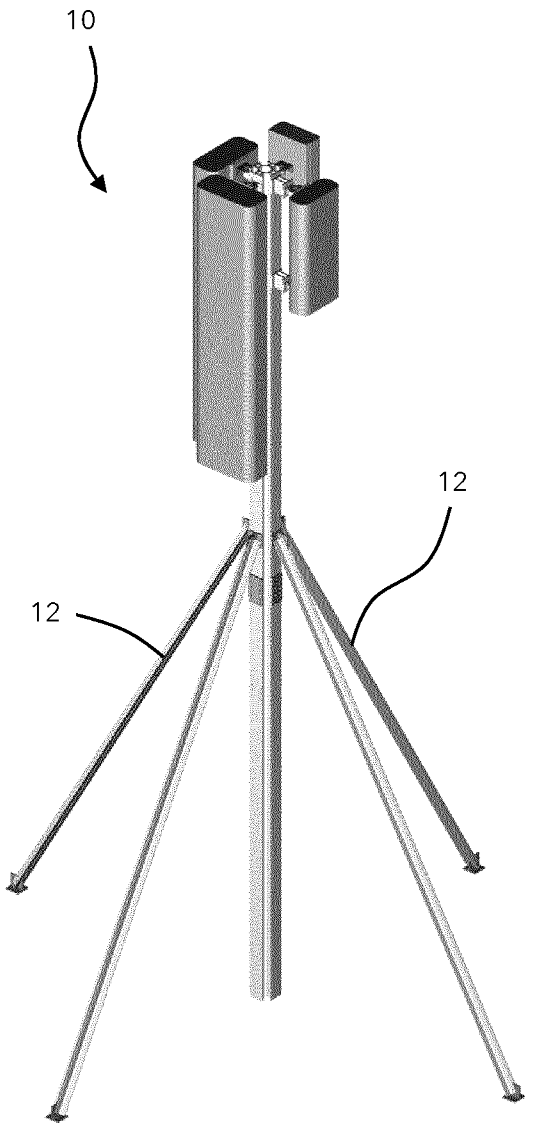
FIG. 1*a* is a perspective view of a first mast assembly in accordance with the present invention.
Figure 1B:
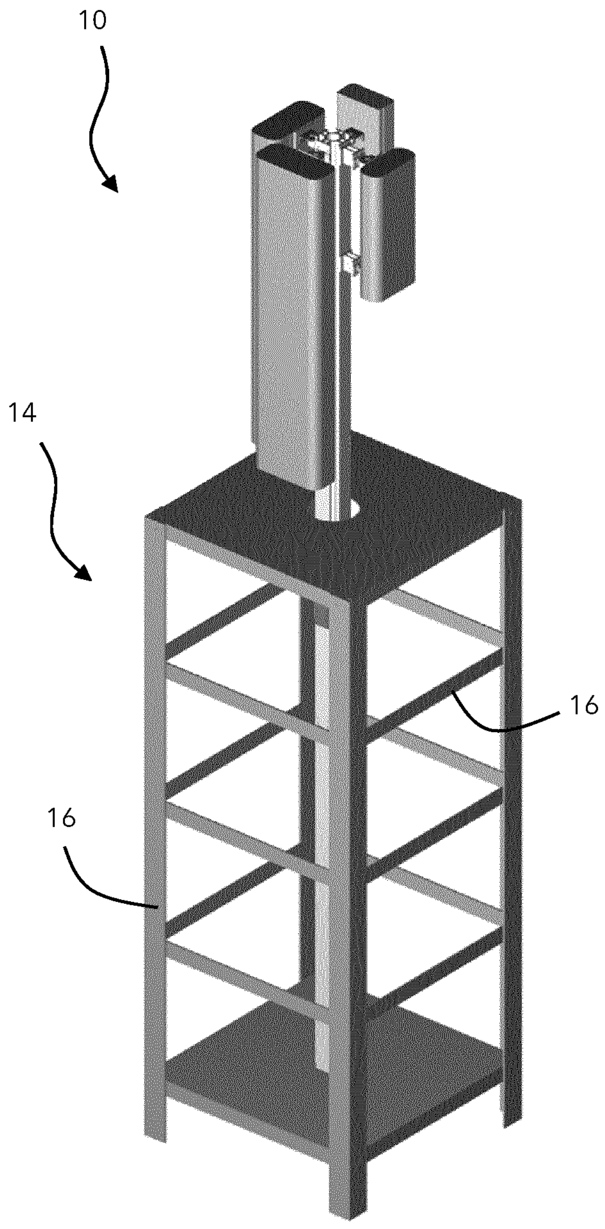
FIG. 1*b* is a perspective view of a second mast assembly in accordance with the present invention.

FIGS. 1*a* and 1*b* show two alternative mast constructions that utilise the present invention. FIG. 1*a* shows a mast 10 having an antenna assembly 100 comprising a central mast member 102, and a plurality of support legs 12 extending outwardly from the member 102 to support it in a vertical position in use. FIG. 1*b* also comprises the antenna assembly 100 comprising a central mast member 102, but the member 102 is installed in a lattice framework 14 comprising a plurality of lattice framework members 16. Both embodiments are typically installed in an elevated position (e.g., on top of a building or mast) and may comprise a radome surrounding the antennas.

Figure 2:
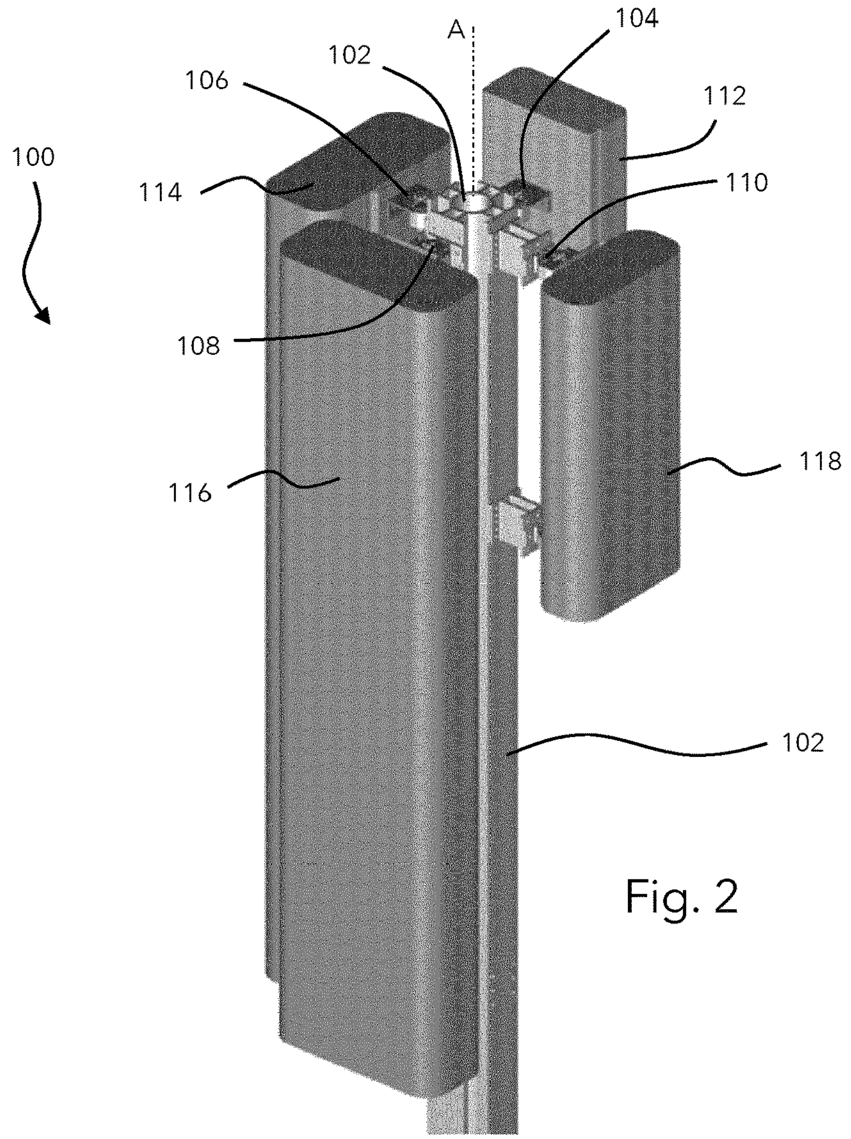
FIG. 2 is a perspective view of a first cellular antenna mounting assembly mounted on a member of the mast of FIG. 1*a;*
Figure 3:
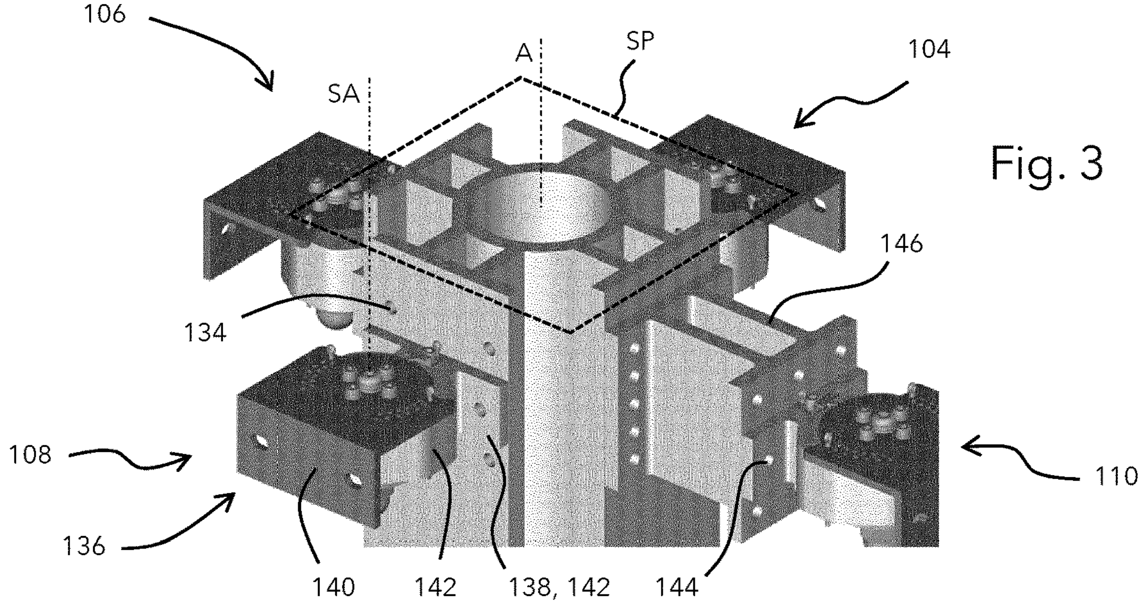
FIG. 3 is a detail view of a part of the assembly of FIG. 2.
Figure 4:
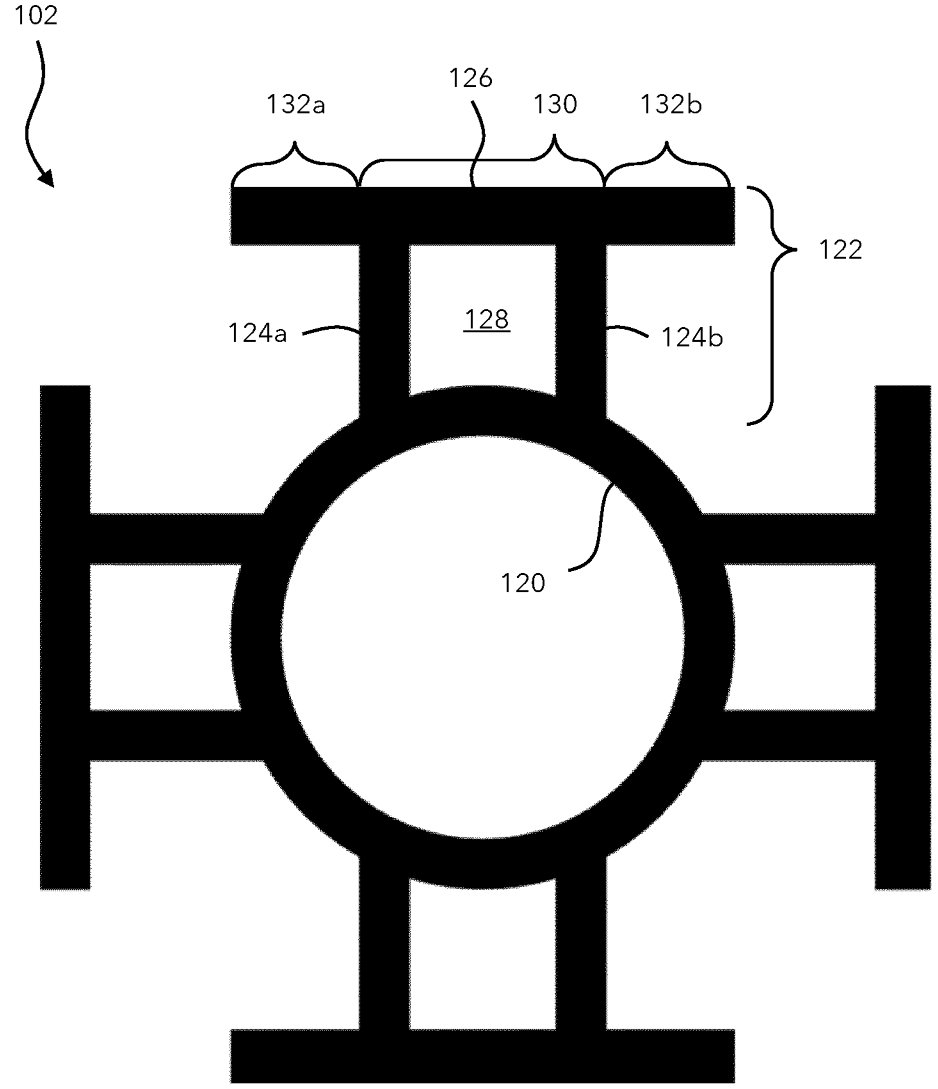
FIG. 4 is a section view of a part of the assembly of FIG. 2.

Referring to FIGS. 2 to 4, a first embodiment of the present invention is shown.

Configuration

Referring to FIG. 2, there is shown the cellular antenna assembly 100. The assembly 100 comprises the structural mast member 102, first, second, third and fourth antenna mounting assemblies 104, 106, 108, 110 and four antennas 112, 114, 116, 118. It will be noted that in FIGS. 1*a* to 3, different mounting assemblies and antennas are shown on the mast member 102, although in reality the antenna mounting assemblies and antennas are identical.

The mast member 102 is shown in more detail in FIGS. 3 and 4. It is an extruded component and is therefore prismatic along a primary axis A having a cross section profile in a section plane SP normal to axis A. The member 102 is elongate, by which we mean it has an axial length which is at least 5 times its largest dimension in cross-section.

Referring to FIG. 4, the cross-section profile of the mast member 102 has a central structural portion 120 which is a closed, circular shape. Four identical, equally spaced mounting formations extend from the structural portion. By way of example, a first mounting formation 122 comprises a first arm 124*a* and a second arm 124*b* which are offset and parallel, each joining the structural portion 120 at spaced apart positions. The arms 124*a*, 124*b* terminate in a mounting flange 126 which is normal to the arms 124*a*, 124*b* such that part of the structural portion 120, the arms 124*b*, 124*b* and the flange 126 form an enclosed section enclosing a void 128. The flange 126 extends past either side of each arm to define a central portion 130 and two overhanging edge portions 132*a*, 132*b*. Referring to FIG. 3, the flange 126 defines through thickness openings 134 in the edge portions 132*a*, 132*b*.

The mounting formations are equally spaced at 90 degrees to each other and are unitary (co-extruded) with the structural portion.

Referring to FIG. 3, the antenna mounting assemblies 104, 106, 108, 110 differ slightly, but all comprise at least two steering units 136 spaced-apart along the axis A. Each steering unit comprises a mast mounting portion 138, an antenna mounting portion 140 and a rotational joint 142 allowing the portions 138, 140 to be rotated about a steering axis SA. The steering units used in the present invention are the same as those described in applicant's previous application WO 2021/074335.

The mast mounting portions 136 each comprising a flange 142 having a plurality of openings 144. The steering units 136 can thereby be mounted to the radially outwardly facing surface of each flange 126. Each of the steering units 136 mounted to a single flange 126 is aligned such that the steering axis SA are aligned.

Attached to each of the assemblies 104, 106, 108, 110 there is provided a respective antenna 112, 114, 116, 118. The antennas are generally elongate and mounted parallel to the axis A. They are mounted to the respective antenna mounting portions 140 of each pair of steering units 136. In this way, the antennas can each be steered about the steering axis SA.

It will be noted that for the antenna mounting assembly 110 in FIG. 3, a spacer 146 is provided to increase the distance between the main axis A and the steering axis SA.

Use

The present invention facilitates use of a structural, load bearing mast member 102 that can also accept direct mounting of steering units without thee clamps of the prior art. Thus the invention provides a solution that is faster to install, lighter and generally stronger than the prior art solutions.

DESCRIPTION OF THE SECOND EMBODIMENT

Figure 5:
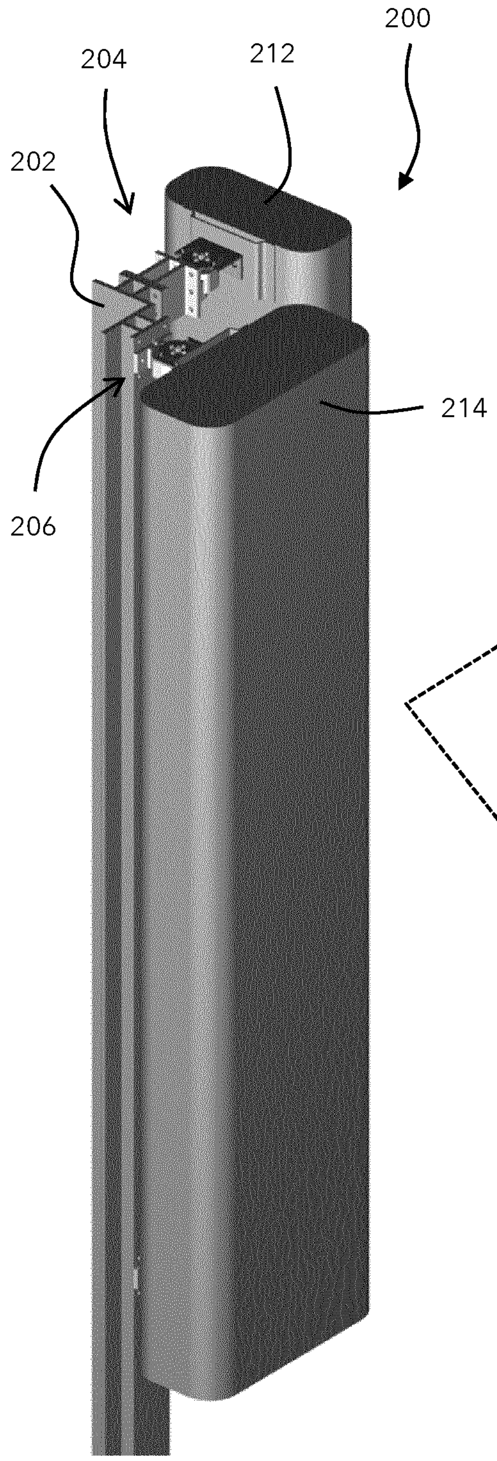
FIG. 5 is a perspective view of a second cellular antenna mounting assembly according to the present invention.
Figure 6:
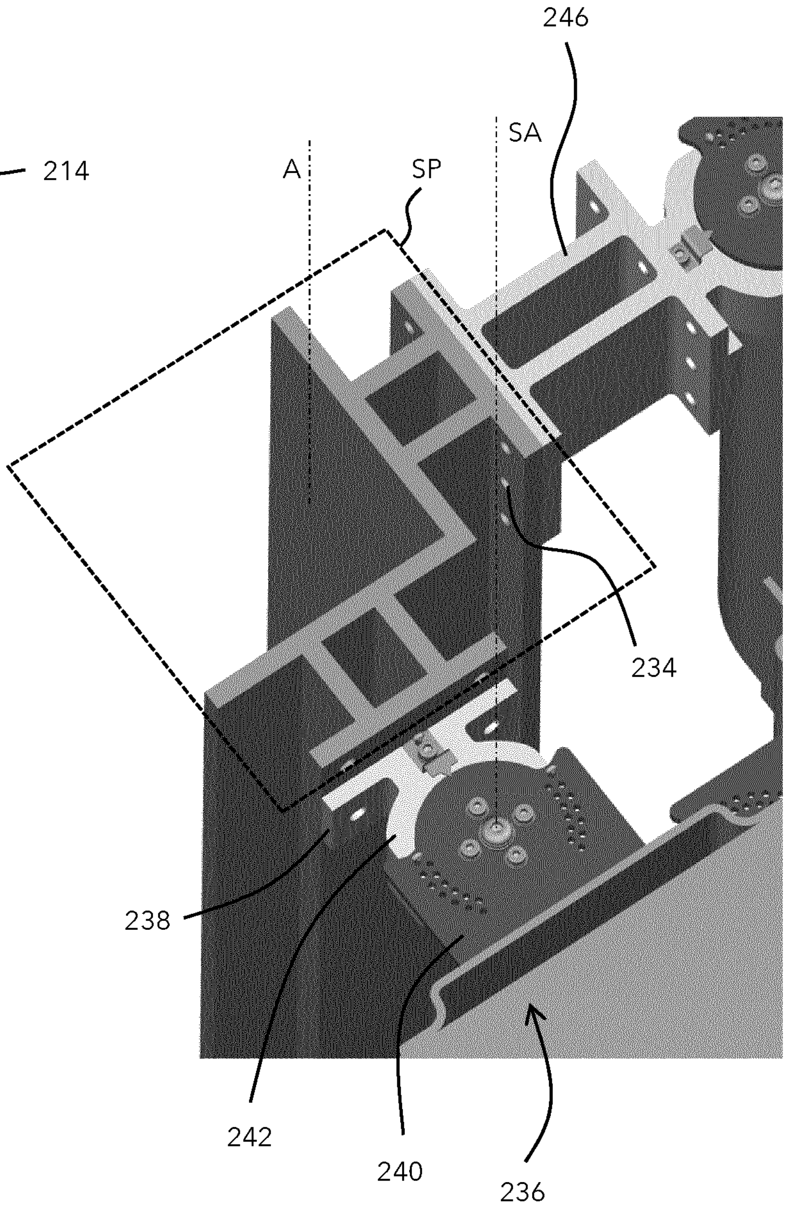
FIG. 6 is a detail view of a part of the assembly of FIG. 5.
Figure 7:
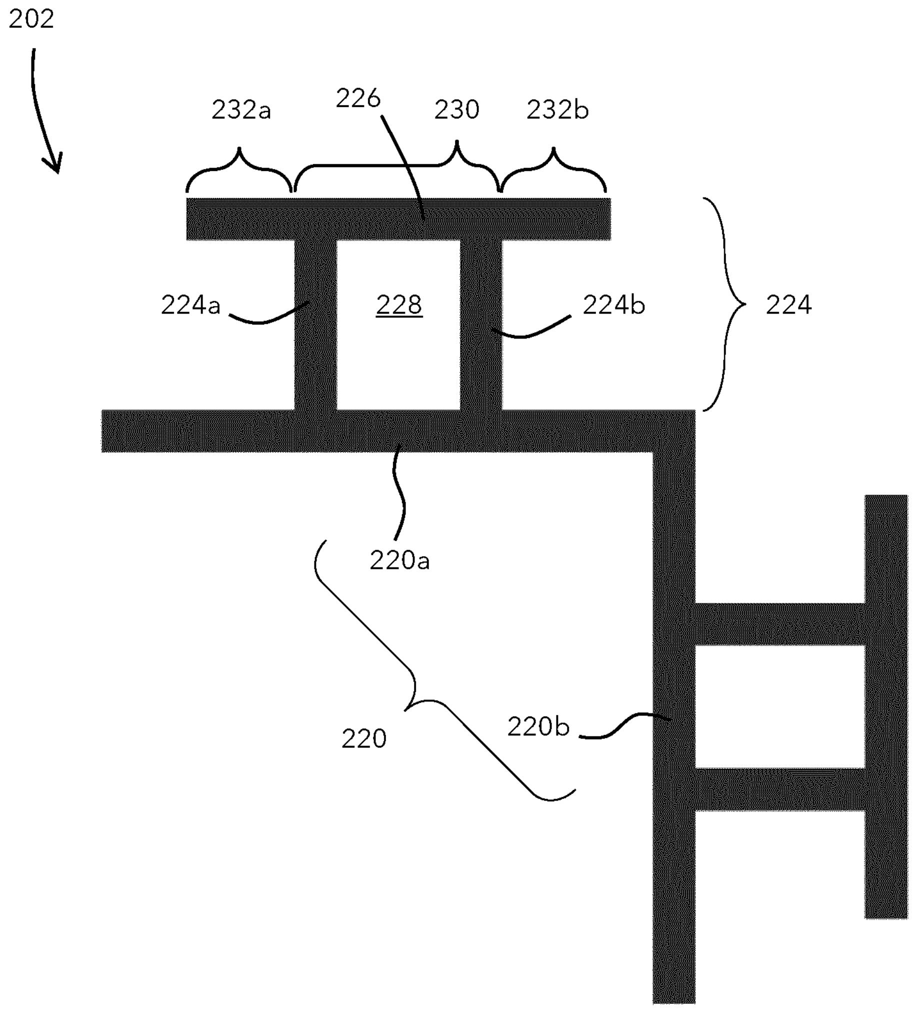
FIG. 7 is a section view of a part of the assembly of FIG. 6.

Referring to FIGS. 5 to 7, a second embodiment of the present invention is shown.

Configuration

Referring to FIG. 5, there is shown a cellular antenna assembly 200. The assembly 200 comprises a mast member 202, first and second antenna mounting assemblies 204, 206 and two antennas 212, 214.

The mast member 202 is shown in more detail in FIGS. 6 and 7. It is an extruded component and is therefore prismatic along a primary axis A having a cross-section profile in a section plane SP normal to axis A.

Referring to FIG. 7, the cross-section profile of the mast member 202 has a structural portion 220 which is a 90-degree angle section having first and second limbs 220*a*, 220*b*. Two mounting formations extend from respective limbs of the structural portion. By way of example, a first mounting formation 224 comprises a first arm 224*a* and a second arm 224*b* which are offset and parallel, each joining the limb 220*a* at spaced apart positions. The arms 224*a*, 224*b* terminate in a mounting flange 226 which is normal to the arms 224*a*, 224*b* such that part of the structural portion 220, the arms 224*b*, 224*b* and the flange 226 form an enclosed section enclosing a void 228. The flange 226 extends past either side of each arm to define a central portion 230 and two overhanging edge portions 232*a*, 232*b*. Referring to FIG. 6, the flange 226 defines through thickness openings 234 in the edge portions 232*a*, 232*b*.

The mounting formations are at 90 degrees to each other and are unitary (co-extruded) with the structural portion.

Referring to FIG. 5, the antenna mounting assemblies 204, 206 each comprises at least two steering units 236 spaced-apart along the axis A. Each steering unit comprises a mast mounting portion 238, an antenna mounting portion 240 and a rotational joint 242 allowing the portions 238, 240 to be rotated about a steering axis SA. The steering units used in the present invention are the same as those described in applicant's previous application WO 2021/074335.

The mast mounting portions 236 each comprising a flange 242 having a plurality of openings 244. The steering units 236 can thereby be mounted to the radially outwardly facing surface of each flange 226. Each of the steering units 236 mounted to a single flange 226 is aligned such that the steering axis SA are aligned.

Attached to each of the assemblies 204, 206, there is provided a respective antenna 212, 214. The antennas are generally elongate and mounted parallel to the axis A. They are mounted to the respective antenna mounting portions 240 of each pair of steering units 236. In this way, the antennas can each be steered about the steering axis SA.

It will be noted that for the antenna mounting assembly 210 in FIG. 6, a spacer 246 is provided to increase the distance between the main axis A and the steering axis SA.

DESCRIPTION OF THE THIRD EMBODIMENT

Figure 8:
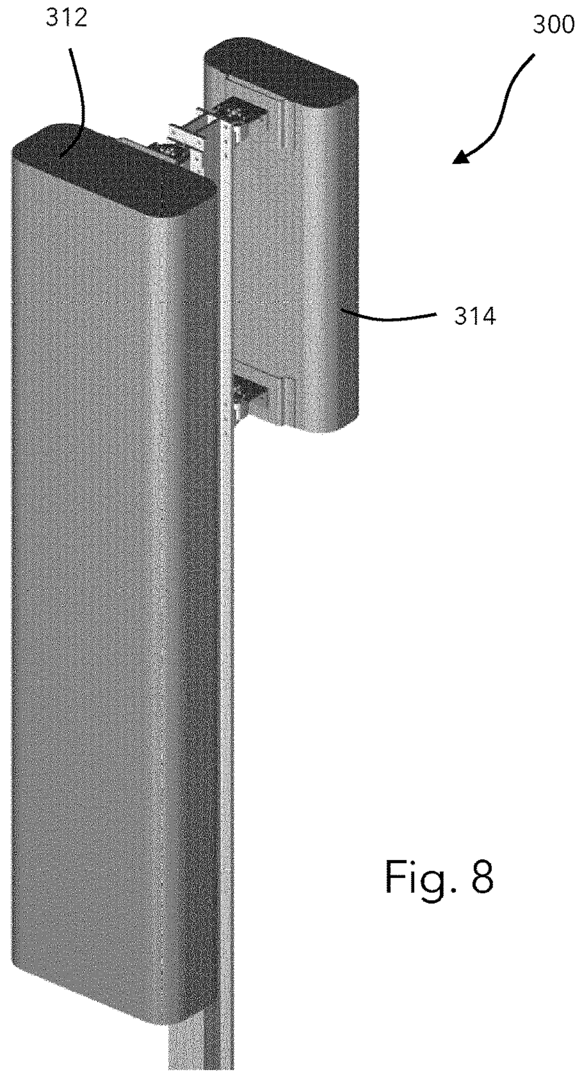
FIG. 8 is a perspective view of a third cellular antenna mounting assembly according to the present invention.
Figure 9:
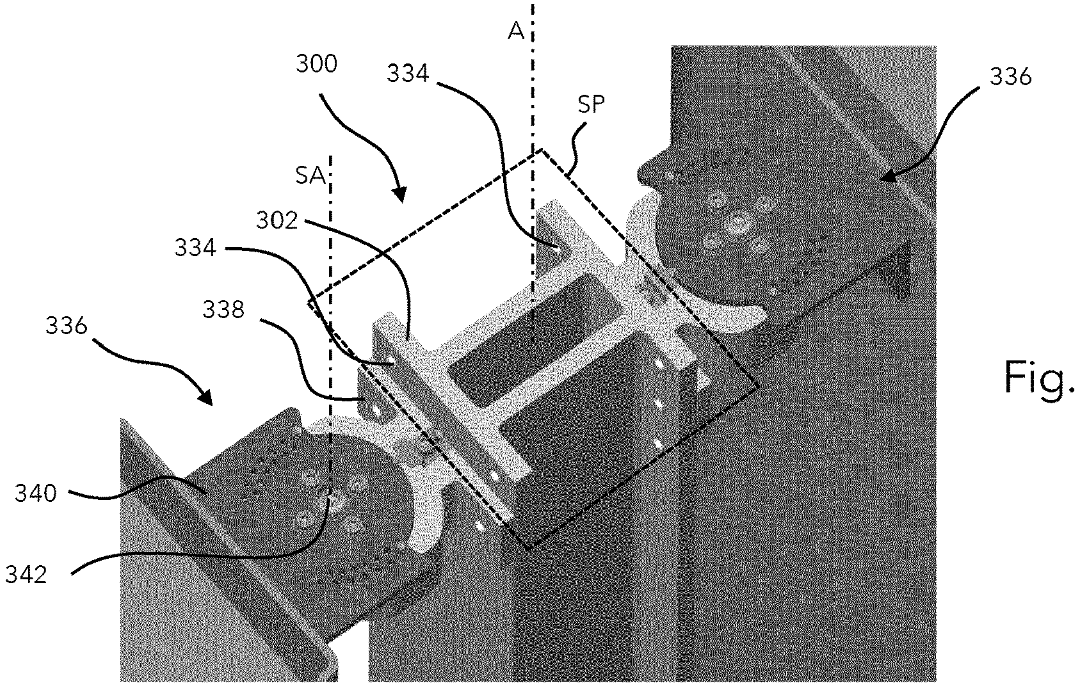
FIG. 9 is a detail view of a part of the assembly of FIG. 8.
Figure 10:
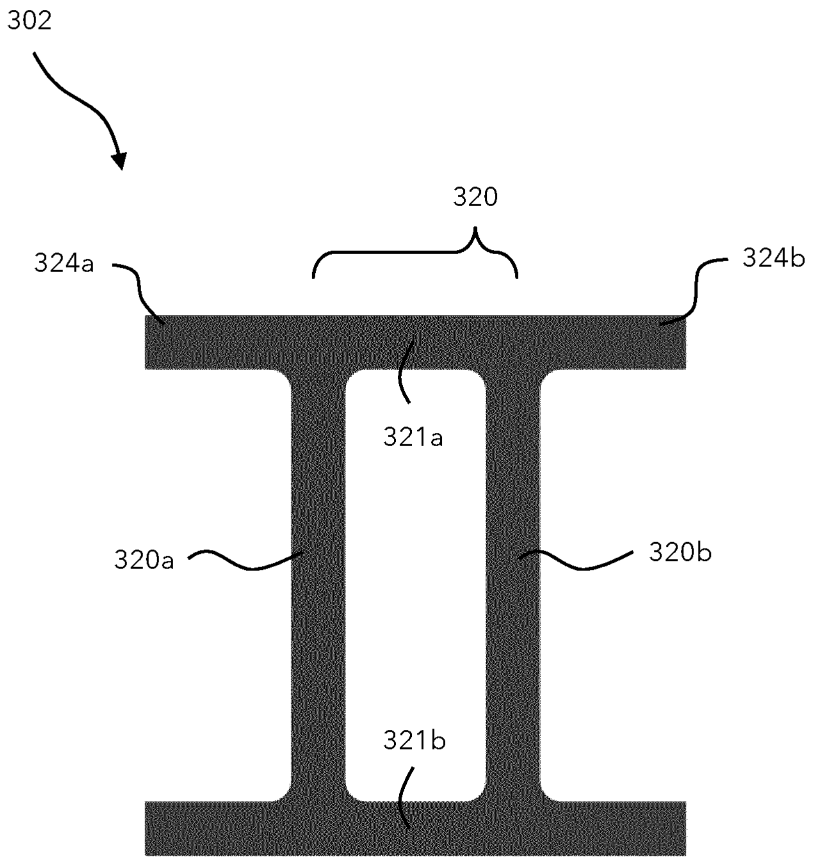
FIG. 10 is a section view of a part of the assembly of FIG. 8.

Referring to FIGS. 8 to 10, a third embodiment of the present invention is shown.

Configuration

Referring to FIGS. 8 and 9, there is shown a cellular antenna assembly 300. The assembly 300 comprises a mast member 302, first and second antenna mounting assemblies 304, 306 and two antennas 312, 314.

The mast member 302 is shown in more detail in FIGS. 9 and 10. It is an extruded component and is therefore prismatic along a primary axis A having a cross-section profile in a section plane SP normal to axis A.

Referring to FIG. 10, the cross-section profile of the mast member 302 has a structural portion 320 which is a hollow rectangular section having first and second long sides 320*a*, 320*b* and first and second short sides 321*a*, 321*b*. Two mounting formations extend from respective ends of the structural portion. A first mounting formation 324 comprises a first mounting flange 324*a* and a second mounting flange 324*b* which parallel and continuous with the short side 321*a* and overhang. Referring to FIG. 9, the flanges 324*a*, 324*b* define through thickness openings 334.

Referring to FIG. 9, the antenna mounting assemblies two steering units 336 are provided on each side of the member 302 and are spaced-apart along the axis A. Each steering unit comprises a mast mounting portion 338, an antenna mounting portion 340 and a rotational joint 342 allowing the portions 338, 340 to be rotated about a steering axis SA. The steering units used in the present invention are the same as those described in applicant's previous application WO 2021/074335.

Each of the steering units 336 mounted to a single side of the member 302 is aligned such that the steering axis SA are aligned.

Attached to each of the assemblies 304, 306, there is provided a respective antenna 312, 314. The antennas are generally elongate and mounted parallel to the axis A. They are mounted to the respective antenna mounting portions 340 of each pair of steering units 336. In this way, the antennas can each be steered about the steering axis SA.

VARIATIONS

As well as being constructed from extruded aluminium, the mast members according to the invention may be constructed from other extruded materials, such as composites.

The invention claimed is:

1. An antenna support system comprising:

a mast comprising a first mast member, the first mast member having:

a structural portion for bearing at least part of a mast load in use; and, a mounting portion;

wherein the structural portion and the mounting portion are formed as part of a unitary first structural mast member cross-section;

a first steering unit having a first steering unit steering axis;

a second steering unit having a second steering unit steering axis;

a first antenna;

wherein the first steering unit and the second steering unit are mounted to the mounting portion of the first mast member such that the first steering unit steering axis and the second steering unit steering axis are aligned, and, wherein the first antenna is mounted to the first steering unit and the second steering unit for rotational movement relative to the mast in use.

2. An antenna support system according to claim 1, wherein the first mast member is extruded along a primary axis.

3. An antenna support system according to claim 1, wherein the structural portion is a hollow section.

4. An antenna support system according to claim 3, wherein the hollow section is one of circular and polygonal.

5. An antenna support system according to claim 4, wherein the mounting portion extends radially from the hollow section.

6. An antenna support system according to claim 5, wherein the mounting portion comprises first and second spaced-apart, parallel arms and a mounting flange connected to the arms, distal to the hollow section.

7. An antenna support system according to claim 6, wherein the mounting flange extends outwardly of the arms to form a "T" shape in cross section.

8. An antenna support system according to claim 4, wherein the mounting portion comprises first and second parallel flanges extending from either side of a side of the polygonal cross section.

9. An antenna support system according to claim 1, wherein the structural portion is an angle section.

10. An antenna support system according to claim 8, wherein the mounting portion comprises first and second spaced-apart, parallel arms and a mounting flange connection to the arms, distal to the angle section.

11. An antenna support system according to claim 8, wherein the angle section comprises a first leg and a second leg, and wherein the first structural mast member comprises a first mounting portion extending from the first leg and a second mounting portion extending from the second leg.

12. An antenna support system according to claim 1, wherein the mounting portion comprises a plurality of through-bores for the attachment of the first steering unit and second steering unit.

13. An antenna support system according to claim 11, wherein the mounting portion forms a first flat plate having the plurality of through-bores formed therethrough the plate extending to either side of the structural portion.

14. An antenna support system according to claim 1, wherein the mounting portion is a first mounting portion, and wherein the first mast member comprises a second mounting portion, the first and second mounting portions being unitary with the structural portion.

15. An antenna support system according to claim 14, wherein the first and second mounting portions are equally spaced around a primary axis of the structural portion.

16. An antenna support system according to claim 14, comprising:

a third steering unit; and wherein the third steering unit is mounted to the second mounting portion, and wherein the second antenna is mounted to the third steering unit for rotational movement relative to the mast in use.

17. An antenna support system according to claim 1, wherein the cross-section of the first mast member including the structural portion and mounting portion is constant along its length at, and between, the first and second steering units.

18. A method of manufacturing a structural mast member for a cellular antenna mast comprising the steps of:

providing an extrusion die defining an aperture having:

a structural portion for bearing at least part of the mast load in use; and, a mounting portion for attachment of an antenna;

extruding a structural mast member using the die;

forming openings in the mounting portion;

providing a first antenna steering unit having a first steering unit axis;

providing a second antenna steering unit having a second steering unit axis;

attaching the first antenna steering unit and the second antenna steering unit to the mounting portion such that the first steering unit steering axis and the second steering unit steering axis are aligned;

providing an antenna;

mounting the antenna to the first steering unit and the second steering unit.

19. An antenna support system comprising:

a mast comprising a first mast member, the first mast member having:

a structural portion for bearing at least part of a mast load in use; and, a first mounting portion;

a second mounting portion;

wherein the structural portion, the first mounting portion and the second mounting portion are formed as part of a unitary first structural mast member cross-section;

a first steering unit;

a second steering;

a first antenna;

a second antenna;

wherein the first steering unit is mounted to the first mounting portion, the second steering unit is mounted to the second mounting portion; and, wherein the first antenna is mounted to the first steering unit for rotational movement relative to the mast in use and the second antenna is mounted to the second steering unit for rotational movement relative to the mast in use.

* * * * *